Figure 1:
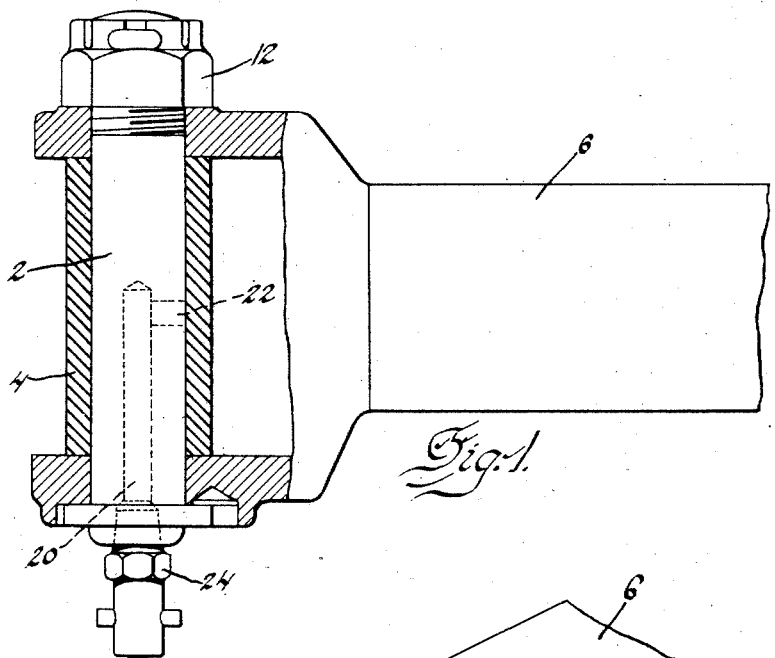

April 30, 1929.   F. T. ELLIS ET AL   1,711,018
SPRING BOLT
Filed May 2, 1925

Inventor
Forrest T. Ellis &
Wallace E. Wilber

Blackmore, Spencer & Flitt
Attorney

Patented Apr. 30, 1929.

1,711,018

UNITED STATES PATENT OFFICE.

FORREST T. ELLIS AND WALLACE E. WILBER, OF DETROIT, MICHIGAN, ASSIGNORS TO GENERAL MOTORS CORPORATION, OF DETROIT, MICHIGAN, A CORPORATION OF DELAWARE.

SPRING BOLT.

Application filed May 2, 1925. Serial No. 27,521.

The object of this invention is to provide a construction of spring bolt which may be made of stock material with very little machining and yet will connect the parts with which it cooperates in a very satisfactory manner. Thus we have used for the body of our bolt a short piece of bar metal and have provided it with a removable head, this head preventing withdrawal of the bolt in one direction and also holding it against rotation. The other end of the bolt is provided with the usual locking nut and the bolt is preferably drilled to serve as a reservoir for lubricant.

The preferred form of our invention is shown on the drawing where

Figure 2:
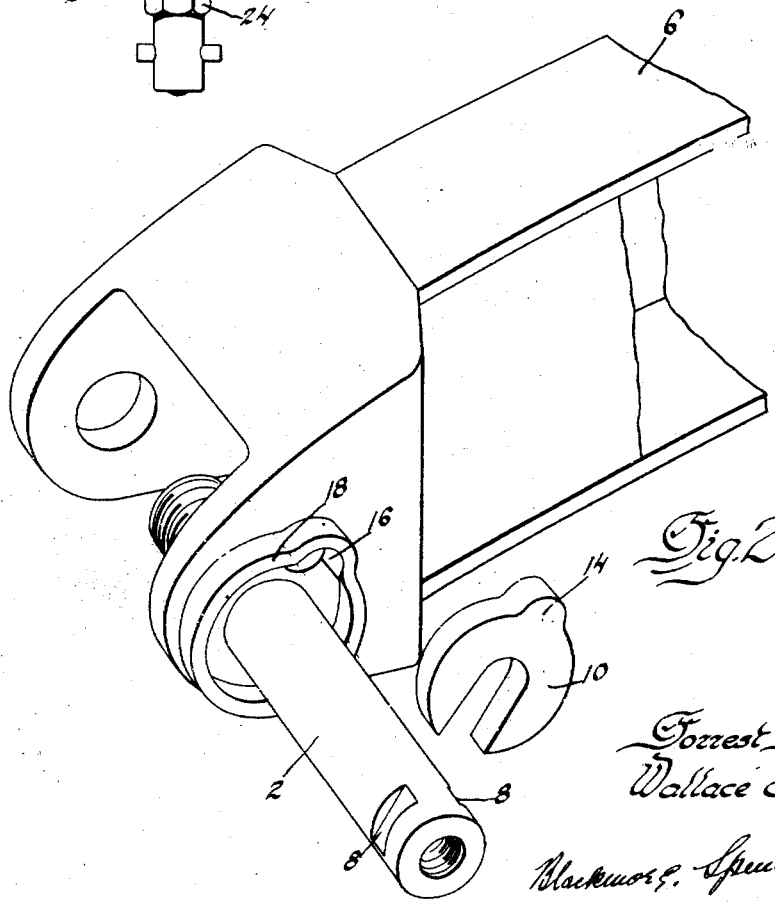

Figure 1 is a plan view with parts in section showing our improved spring bolt in operative relation; and Figure 2 is a view showing the parts in process of being assembled.

We have indicated at 2 a spring bolt which is preferably formed of a length of round bar stock. This bolt serves as a pivotal connection between the eye formed on the end of a leaf spring and shown at 4 and the vehicle frame, part of which is shown at 6. In the claims we have referred to the member 6 as a spring suspension part for we do not wish to limit ourselves to the particular type of spring suspension disclosed in which the spring is directly connected to the vehicle frame. Nor indeed do we wish to exclude from the scope of our claims a construction in which the bolt may be locked to the spring instead of to the frame part.

This bolt is threaded at one end and at the other is provided with key-ways or notches 8. A removable key 10 is adapted to straddle the bolt and engage the notches 8 preventing endwise separation of the bolt 2 from the spring suspension part 6 in one direction. The customary nut 12 engages the other end of the bolt and prevents endwise separation of the bolt and part in the other direction.

In order to prevent rotation of the bolt we have provided the key 10 with a protuberance 14 which is adapted to engage a key-way 16 formed in a flange 18 serving to snugly receive the key 10.

The bolt 2 is preferably drilled as at 20 to form a reservoir for oil which feeds to the rubbing surfaces through the duct 22. The outer end of the drilled opening is provided with an oil cup shown at 24.

While we have shown our invention applied to bolts used in connection with vehicle springs it is to be understood that it is not limited to use in this particular field but is capable of application in many analogous relations of parts.

We claim:

1. The combination of a support, a headless bolt adapted for mounting in the support and provided at one end with notches in its sides, a retainer with spaced arms for straddling the bolt and seating in the notches, a member on the support to secure the retainer against withdrawal from its seat in the notches, and means for securing the bolt and retainer in place and preventing their axial movement.

2. The combination of a support, a headless bolt adapted for mounting in the support and provided at one end with notches in its sides, a retainer with spaced arms for straddling the bolt and seating in the notches, a member on the support to secure the retainer against withdrawal from its seat in the notches, means for securing the bolt and retainer in place and preventing their axial and rotary movement.

In testimony whereof we affix our signatures.

FORREST T. ELLIS.
WALLACE E. WILBER.